Patented July 14, 1931

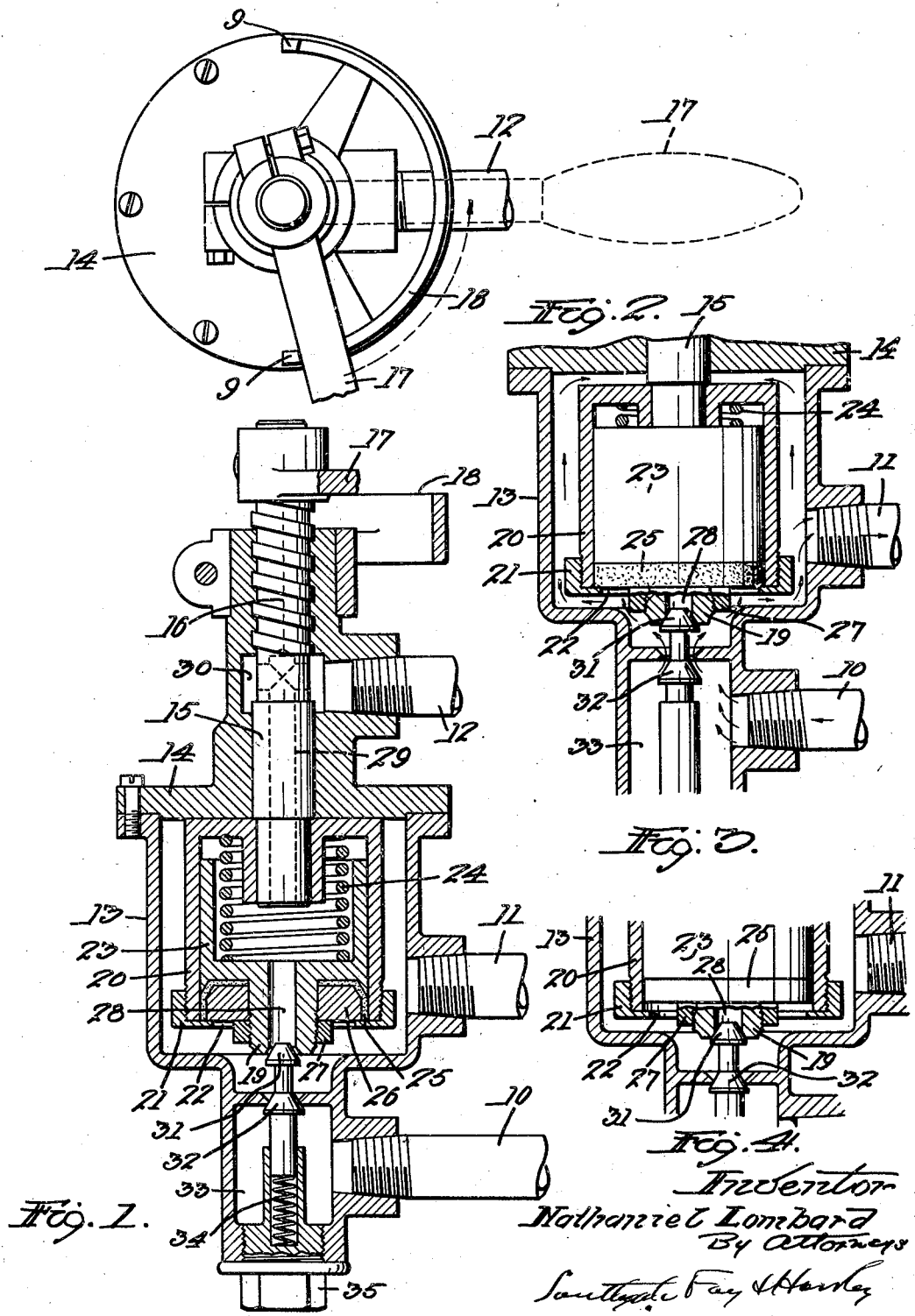

1,814,565

UNITED STATES PATENT OFFICE

NATHANIEL LOMBARD, OF WORCESTER, MASSACHUSETTS

AIR VALVE

Application filed July 16, 1929. Serial No. 378,765.

This invention relates to an air valve for controlling an air brake system or the like, and is particularly adapted for use on street cars.

The principal objects of the invention are to provide an air valve for controlling the supply of air to a brake, or the like, in such a way that the turning of the handle of the valve up to a certain point will allow air to enter the apparatus and pass to the brake, or other device to be operated, and give a certain pressure thereto, and the further turning of the handle in the same direction will supply more air and provide a higher pressure, and by turning the handle back a little the air will be exhausted in proportion and the valves will seat themselves again; to provide a construction of this kind in which the use of a diaphragm, which wears out in practice, will be entirely avoided and in place of the same mechanical metallic parts will be employed; and especially to provide a construction in which it will not be necessary to continually hitch the handle of the valve back and forth to create the desired pressure to the brake cylinder.

Other objects and advantages of the invention will appear hereinafter.

Reference is to be had to the accompanying drawings, in which

Fig. 1 is a longitudinal diametrical sectional view of the apparatus showing it in the off position;

Fig. 2 is a plan;

Fig. 3 is a view like Fig. 1, but showing the air entering the brake and exhaust closed, and Fig. 4 is a similar view, showing the position of the parts with both the admission and exhaust closed.

The invention is shown in a form in which the air is supplied to it under pressure from a suitable source through an inlet pipe 10 and is delivered to the brake or air apparatus through a pipe 11, and the exhaust pipe 12 is provided in a convenient place.

The apparatus comprises a casing 13 having a cover 14 constituting part of the casing, which cover is bored out and threaded to provide for a stem 15 having a quick threaded portion 16. The controller handle 17, which is secured to the top of the valve, is turned over a support 18 for a pair of stops 9.

On the bottom of the valve stem 15 is a cylinder 20 which moves up and down with the stem in a casing 13 as a unit. It is provided on the bottom with a flat plate 21 which is all open through a central passage 22. In the cylinder is carried a cup-shaped piston 23 which fits in tightly. A strong spring 24 forces this piston down. The piston is provided at the bottom with a packing 25 and a plate or head 26 secured in position by a nut 27 on a projecting part 19 of the piston. This part 19 is provided with a central perforation 28, and the valve stem is provided with a perforation 29 and with ports which exhaust into a chamber 30 into which the exhaust pipe 12 is connected. Thus there is a free passage from the bottom of the projection 19 to the exhaust pipe 12.

The bottom of this passage is in the form of a valve seat controlled by a valve 31 which is integral with a second valve 32. The compressed air comes in from the pipe 10 into a chamber 33, the outlet of which is controlled by the valve 32. This valve is pressed upwardly by a spring 34 and the force of this spring 34 can be adjusted by an external nut 35 as will be obvious.

The position shown in Fig. 1 is the normal position, with the valve shut off. Any air entrapped in the space between the casing 13 and the cylinder 20 is exhausted through the valve seat in the bottom of the passage 28 to the passage 29 and outlet pipe 12. Now if the valve lever 17 is turned in the direction to lower the cylinder, the exhaust passage will first be closed by the valve 31 which will thereby be brought to its seat by the lowering of the whole cylinder. If lowered beyond a very short distance the valve 32 will be opened and the air under pressure will enter the space around the cylinder 20 and be conducted to the brake. This is the position shown in Fig. 3. If the handle is left in this position the surplus air under pressure will raise the piston 23, by pressure on the bottom of the same, and the result will be to raise the valve seat in its bottom far enough to allow the valve 32 to close. This is shown in Fig. 4. If, however, the handle 17 is left in the position in which it was set and then turned in the direction to lower the cylinder 20 further, the effect of this, of course, will be to open the valve 32 again and allow more pressure to come in and set the brakes harder.

To release the brakes the handle 17 is turned backwardly to the starting point, which closes the valve 32 and opens the valve 31, as stated, and the parts will come back to the position shown in Fig. 1.

From this construction it will be seen that there is no diaphragm to get out of order or to leak, and thus necessitate the jiggling of the handle 17 after it is set. There is no necessity for moving this handle up by degrees after the proper amount of pressure of air has once been transmitted to the brakes. The release of the pressure is practically instantaneous and it restores the parts to the condition for operation again whenever required. The whole thing consists of few parts which are of such a nature that there is no likelihood of their getting out of order with any reasonable amount of use or when standing without use. The opening of the valve for admitting pressure is positive.

Although I have illustrated and described only a single form of the invention I am aware of the fact that changes can be made therein by any person skilled in the art without departing from the scope of the invention as expressed in the claims. Therefore, I do not wish to be limited to the exact form shown, but what I do claim is:—

1. In an air controlling valve, the combination of a casing having inlet and exhaust pipes and a pipe to direct the compressed air to the place where it is to be used, a cylinder bodily movable in said casing, means for turning the cylinder on its axis, means by which the cylinder is advanced or retracted when it is turned, said cylinder being hollow, a piston fitting in the cylinder, means for forcing the piston along in and toward the open end of the cylinder, said piston having a passage for the air with a valve seat at the end thereof and communicating with the exhaust pipe, and spring-pressed valves, one being adapted to close said valve seat and the other being adapted to control the passage of the air into the casing from the supply pipe.

2. In an air controlling valve, the combination of a casing having inlet and exhaust pipes and a pipe to direct the compressed air to the place where it is to be used, a cylinder bodily movable longitudinally in said casing, a stem for the cylinder having a screw thread by which the stem and cylinder are advanced or retracted when the stem is turned, said cylinder being hollow, a piston fitting the internal surface of the cylinder, yielding means for forcing the piston to the end of the cylinder, said piston having a passage for the air with a valve seat at the end thereof and communicating through the stem with the exhaust pipe, and a double spring-pressed valve, one part of the valve being adapted to close said valve seat and the other being adapted to control the passage of the air into the casing from the supply pipe.

3. In an air controlling valve, the combination of a casing having an inlet pipe for compressed air and a pipe for delivering to the desired point and also provided with a partition having a valve seat between the two pipes, a spring-pressed valve for said seat having a second valve on its end inside the chamber of the casing to which chamber a second named pipe is connected, a cylinder in said casing having a stem provided with a passage therethrough, the end of which constitutes a valve seat adapted to be closed by the second valve, a handle fixed to the end of the stem for operating it, a screw thread on the stem by which the turning of the handle will move the cylinder bodily longitudinally in said casing to bring the second valve seat into or out of contact with its valve and to press the first valve back from its seat when the arm is turned far enough.

4. In an air controlling valve, the combination with a casing having air supply and exhaust pipes and a pipe for delivering to the desired point, of a cylinder bodily movable in the casing, a spring-pressed piston mounted in said cylinder and having a projection thereon provided with a passage adapted to communicate with the exhaust pipe, a valve seat at the end of said passage, two valves, one adapted to close said valve seat and the other adapted to control communication between the supply pipe and the interior of said casing, yielding means for forcing said valves into closed position, the first valve being normally located in a slightly open position, whereby when the cylinder is moved inwardly it first closes its valve seat by means of said valve and stops communication from the chamber to the exhaust and then unseats the second valve to allow compressed air to enter the chamber around the cylinder and to pass to the point at which it is to be used.

5. In an air controlling valve, the combination with a casing having air supply and exhaust pipes and a pipe for delivering to the desired point, of a cylinder bodily movable along the casing, a spring-pressed piston mounted in said cylinder and having a central projection thereon provided with a passage therethrough adapted to communicate with the exhaust pipe, a valve seat at the end of said passage, a doube valve having one part adapted to close said valve seat and the other part adapted to control communication between the supply pipe and the interior of said casing, yielding means for forcing said valve into closed position, the first valve being normally located in a slightly open position, whereby when the supply valve is opened the pressure on the bottom of said piston will force the piston back and allow the valves to move to cut off communication between the supply and the interior of said casing while the communication to the exhaust through said valve seat is kept closed.

6. In an air controlling valve, the combination with a casing having a chamber therein and provided with a pipe for directing the air to the point at which it is to be used, of a cylinder bodily movable in said chamber, said cylinder being hollow, a piston in the cylinder, means for constantly forcing the piston outwardly, a plate on the cylinder projecting inwardly far enough to stop the piston and limit its outward motion but having an opening therein for allowing the pressure in the chamber to act on the piston to force it back, said piston having a perforated projection extending beyond the end of the cylinder and having a valve seat therein controlling communication between the chamber and the exhaust, said chamber having a valve seat controlling communication between it and the supply of compressed air, two valves for controlling the two valve seats, yielding means for normally holding the valves in one extreme position with the last named valve seat closed, and means for holding the cylinder normally in the off position in which the other valve seat is open, whereby when the cylinder is moved inwardly the latter named valve seat will first be closed to shut off communication with the exhaust and immediately afterwards the other valve will open to admit a supply of air to the chamber.

7. In an air controlling valve, the combination with a casing having a chamber therein and provided with a pipe for directing the air to the point at which it is to be used, a cylinder bodily movable in said chamber, said cylinder being hollow, a piston in the cylinder, a spring in the cylinder for forcing the piston outwardly and constantly, and a packing at the outer end of the piston, of a plate on the cylinder projecting inwardly far enough to stop the piston and limit its outward motion, said piston having a central perforated projection extending beyond the end of the cylinder and having a valve seat therein controlling communication between the chamber and the exhaust, said chamber having a valve seat controlling communication between it and the supply of compressed air, a double valve for controlling the two valve seats, a spring for normally holding them in one extreme position with the last named valve seat closed, and means for holding the cylinder normally in the off position in which the other valve seat is open, whereby when the cylinder is moved inwardly the latter named valve seat will first be closed to shut off communication with the exhaust, the stop plate on the cylinder having an opening therethrough, whereby the air under compression is communicated to the piston and that is moved back in the cylinder to remove the valve seat thereof out of reach of its valve.

8. In an air controlling valve, the combination with a casing, of a hollow cylinder bodily movable therein, a piston fitting in the cylinder, means for forcing the piston toward the open end of the cylinder, said piston having means for controlling the exhaust from the casing, and simultaneously operating valves for controlling the exhaust and admission respectively.

In testimony whereof I have hereunto affixed my signature.

NATHANIEL LOMBARD.